United States Patent

Villarejos et al.

[11] 3,911,087
[45] Oct. 7, 1975

[54] SELECTIVE SOLVENT EXTRACTION OF SULFATE IMPURITIES FROM PHOSPHORIC ACID

[75] Inventors: Miguel O. Villarejos, Caparra Heights, P.R.; Tadeusz K. Wiewiorowski, New Orleans; Willis L. Thornsberry, Jr., Gretna, both of La.

[73] Assignee: Freeport Minerals Company, New York, N.Y.

[22] Filed: Oct. 19, 1973

[21] Appl. No.: 407,935

[52] U.S. Cl. .............................. 423/321
[51] Int. Cl.² ................................ C01B 25/16
[58] Field of Search ............... 423/320, 321, 167

[56] References Cited
UNITED STATES PATENTS

| | | | |
|---|---|---|---|
| 3,333,924 | 8/1967 | Hazen et al. | 423/321 |
| 3,361,527 | 1/1968 | Hinkenbein et al. | 423/321 |
| 3,367,749 | 2/1968 | Koerner et al. | 423/321 |
| 3,458,282 | 7/1969 | Koerner et al. | 423/321 |

Primary Examiner—Oscar R. Vertiz
Assistant Examiner—Eugene T. Wheelock
Attorney, Agent, or Firm—Lawrence W. Flynn

[57] ABSTRACT

While it is known that substantial amounts of the sulfate and fluorine impurities present in phosphoric acid can be concurrently extracted from the acid by treating it with a water immiscible amine enriched extractant, it has now been found that most of the sulfate can be extracted without concurrently extracting large amounts of the fluorine in the acid if a certain combination of treatment conditions is observed. Thus selective sulfate extraction surprisingly occurs when 35 to 44% $P_2O_5$ acid is treated with a water immiscible extractant containing about 1 to 3 moles of a tertiary organic amine per mole of sulfate in the acid. With the present invention, virtually all the sulfate present in the acid can be extracted while concurrently extracting only 25% of the fluorine. Selective sulfate extraction is an advantage whenever it is desirable to separately recover the fluorine in the acid in the conventional fluorine recovery systems of phosphoric acid manufacturing processes.

18 Claims, 2 Drawing Figures

3,911,087

SELECTIVE SOLVENT EXTRACTION OF SULFATE IMPURITIES FROM PHOSPHORIC ACID

BACKGROUND OF THE INVENTION

This invention relates to the purification of phosphoric acid by solvent extraction techniques and, more particularly, to the purification of wet process phosphoric acid.

In the manufacture of phosphoric acid by the wet process, phosphate rock is treated with an acid such as sulfuric acid to produce an aqueous slurry of phosphoric acid and calcium sulfate (gypsum). The phosphoric acid is normally separated from the gypsum solids by filtration to yield a dilute or "crude" phosphoric acid filtrate containing about 30% $P_2O_5$ by weight. The crude acid contains various types of impurities such as sulfates, fluorides, iron and aluminum, which can interfere with its subsequent processing and constitute undesirable contaminants in the final product acid.

Various techniques have been proposed to purify the acid in order to provide a high quality product suitable for use in food chemicals and, in general, in the manufacture of any products which require the use of high purity phosphoric acid. Among these, solvent extraction techniques are known which efficiently separate the impurities from the crude acid either by extracting the $P_2O_5$ values from the acid and leaving the impurities in the raffinate, or by extracting the impurities from the acid and leaving the $P_2O_5$ values in the raffinate. Certain secondary and tertiary amines and acid salts thereof, quaternary ammonium compounds, alcohols and alkyl derivatives of phosphoric acid, for example, have been used as the extracting ingredient in the extractant solutions of these techniques.

The present invention is concerned with an acid purification process in which impurities such as sulfate and fluorine are extracted into an extractant comprising a substantially water immiscible organic liquid and an amine, leaving the $P_2O_5$ values in the raffinate. Such a process is disclosed in U.S. Pat. Nos. 3,458,282 and 3,367,749.

It has been the common practice in processes which use this technique to carry out the extraction of the acid when its $P_2O_5$ concentration is about 30% $P_2O_5$ and to remove the solids present in the acid at this point prior to the extraction step. Thus crude wet process phosphoric acid is first clarified to remove most of its undissolved impurities and the clarified acid is then treated with the water immiscible extractant. The extracted acid is subsequently concentrated to a higher $P_2O_5$ content, such as about 54% $P_2O_5$, and further clarified to remove most of the solids which have formed during concentration. The extract containing the sulfate and fluoride impurities is then stripped, normally with an aqueous hydroxide solution to separate these impurities from the organic extractant so the lean extractant can be recycled to the process where it is reused in the extraction of the clarified dilute acid. The processes of U.S. Pat. Nos. 3,458,282 and 3,367,749 are designed for the concurrent removal of substantial amounts of both the sulfate and fluoride impurities, and have many advantages from the standpoint of the production of a high quality acid. They do not allow, however, for the separate recovery of fluorine values by conventional vapor scrubbing techniques during and/or after the evaporation of the acid to higher $P_2O_5$ levels, a desirable feature in some phosphoric acid plants.

It is, therefore, a general object of this invention to provide a method for purifying phosphoric acid by an amine solvent extraction technique in which sulfate impurities are selectively extracted from the acid while most of the fluorine impurities remain behind in the treated acid and are separately removed by other techniques later in the processing of the acid.

It is another object of the invention to provide a method for purifying phosphoric acid by an amine solvent extraction technique which is particularly useful in processes where the separate removal and recovery of fluorine values as a by-product of the process is an important consideration.

It is another object of the invention to provide a method whereby the volume of phosphoric acid which must be extracted is significantly reduced compared to the prior art methods, thereby significantly decreasing the cost of the extraction equipment.

These and other advantages will be apparent to those skilled in the art upon a consideration of this entire disclosure.

SUMMARY OF THE INVENTION

The above objectives are accomplished, in accordance with this invention, by carefully selecting (1) the concentration of $P_2O_5$ at which the acid is extracted, (2) the type of amine used in the extractant, and (3) the amount of amine present in the extractant. When these three conditions are met, selective sulfate extraction surprisingly occurs. By "selective sulfate extraction" is generally meant that the percentage of the sulfate present in the acid which is extracted is significantly greater than the percentage of the fluorine present in the acid which is extracted. Specifically, selective sulfate extraction is obtained when wet process phosphoric acid having a $P_2O_5$ concentration within the range of about 35 to 44% $P_2O_5$ is treated with an extractant comprising a substantially water immiscible organic liquid and about 1 to 3 moles of a tertiary amine for every mole of sulfate in the acid. The tertiary amine is an organic amine containing from 8 to 60 carbon atoms in which at least one of the substituents on the nitrogen is a hydrocarbon having at least 6 carbon atoms.

The acid is normally clarified prior to its extraction in order to remove solids whereupon it is treated with the extractant for a period of time sufficient to allow the sulfate to selectively transfer from the acid to the extractant. The sulfate depleted aqueous acid layer is then separated from the sulfate enriched organic extract.

Under the preferred conditions of treatment, the extracted acid, or raffinate, is substantially free of sulfate but still contains a major amount of the originally present fluorine impurities and $P_2O_5$ values of the acid. The raffinate is concentrated to a higher $P_2O_5$ content such as about 54–60% $P_2O_5$, and the fluorine values are conveniently separately recovered from the raffinate during and/or after the conventional concentration steps of the wet process. The separated sulfate loaded extract is contacted with an aqueous hydroxide solution which strips the sulfate from the extract. The stripped sulfate impurities are normally returned to the attack system of the wet process and are eliminated through the filtering operations of the process, while the lean organic extract is normally returned to the extraction step for reuse in extracting the sulfate impurities from 35 to 44% P₂O₅ acid. Make-up extractant is added as needed to compensate for various losses in the system.

The extent of the selectivity of the extraction can be expressed quantitatively by a "sulfate selectivity factor" defined as the percentage of the sulfate originally present in the acid which is extracted, divided by the percentage of the fluorine originally present in the acid which is extracted, these percentages being computed from the measured sulfate and fluorine concentrations of the acid before and after the extraction. Thus, for example, if the acid contained 2% sulfate and 2% fluorine before extraction and 0.1% sulfate and 1.5% fluorine after treatment, 1.9/2.0 or 95% of the sulfate was extracted while only 0.5/2.0 or 25% of the fluorine was extracted. The sulfate selectivity factor therefore is 95/25 or 3.8. Numerically, the factor is defined by the following equation:

$$S = \frac{1 - \frac{[SO_4]_A}{[SO_4]_B}}{1 - \frac{[F]_A}{[F]_B}}$$

Where
S = the sulfate selectivity factor;
[SO4]B = the measured weight % sulfate in the acid before extraction;
[SO4]A = the measured weight % sulfate in the acid after extraction;
[F]$_B$ = the measured weight % fluorine in the acid before extraction;
[F]$_A$ = the measured weight % fluorine in the acid after extraction;

As the value of the factor increases, sulfate removal becomes progressively more selective, and as it decreases sulfate removal becomes progressively less selective. Thus, in a non-selective process in which virtually all the sulfate and fluoride were concurrently extracted, or in which substantially equal proportions of the sulfate and fluoride were extracted, the factor would be about 1. With the highly selective method of the present invention, the factor is at least 2 (signifying that twice as much available sulfate is extracted as available fluorine) and generally ranges from about 2 to 4, with a factor of 4 obtainable under the preferred conditions of the invention.

Illustratively, the present invention can remove on a selective basis from about 55 to 99% of the sulfate, depending upon such factors as the P₂O₅ and sulfate concentration of the acid, and the type and amount of amine used. For example, at 99% removal, fluorine removal of only 25% may occur for a sulfate selectivity factor of almost 4 while at 55% sulfate removal, as little as 15% fluorine removal may occur for a sulfate selectivity factor of about 3.68. Fluorine removal can also vary widely without destroying the sulfate selectivity of the invention, depending upon such factors as the P₂O₅ and fluorine concentration of the acid, and the type and amount of amine used. Thus, as much as about 45% fluorine could be extracted, but under such conditions that virtually complete sulfate removal occurs, for a sulfate selectivity factor of about 2. Thus, while the percentages of fluorine and sulfate which are extractable can generally vary from about 15% to 50% for fluorine and from about 55% to 99% for sulfate, the extraction remains selective in favor of the sulfate under the operating conditions of the invention, and continuously produces sulfate selectivity factors in the range of about 2 to 4. Stated differently, phosphoric acid treated in accordance with the invention still contains about 50 to 85% of its original fluorine content but only about 1 to 45% of its original sulfate content.

It has been found that when the P₂O₅ concentration of the acid falls below about 35%, selective sulfate removal does not take place with most common amine extractants, including those used in the present invention. On the other hand, if the P₂O₅ concentration of the acid rises above about 35%, certain amines (secondary amines, for example) tend to form emulsions which make the required phase separation difficult, while certain other amines (certain acidic amine salts such as the sulfate salts, for example) do not extract a sufficient amount of sulfate to make the process practical. It has been surprisingly found that it is only certain types of tertiary amines, in the narrow range of about 35 to 44% of P₂O₅, which provide selective extraction of substantial amounts of sulfate without the tendency to form undesirable emulsions. Above acid concentrations of about 44% P₂O₅, the tendency for most amines, including the tertiary amines used in the present invention is to form unwanted emulsions. Furthermore, the amines generally extract excessive amounts of P₂O₅ values at acid strengths above 44%.

The significance of the P₂O₅ concentration of the extracted acid upon the sulfate selectivity achieved is shown in the graph of accompanying FIG. 2, in which the sulfate selectivity factor remains below 2 until a P₂O₅ concentration of about 35% is reached, at which point the factor increases rapidly reaching a value of about 4 at about 44% P₂O₅. Above a level of 44% P₂O₅, it becomes difficult to determine the selectivity factor because of the tendency of the amines to form emulsions with the acid thereby substantially negating the ability of the process to separate impurities from the acid since the required aqueousorganic phase separation can no longer be efficiently carried out.

Although tertiary amines are effective in the 35 to 44% P₂O₅ range, the amount used must be carefully controlled to preserve this efficacy. Thus, if less than about 1 mole of tertiary amine is used per mole of sulfate in the acid, it becomes difficult to extract substantial amounts of sulfate thus rendering the selective extraction of the sulfate inefficient. On the other hand, if more than about 3 moles of tertiary amine are used per mole of sulfate, excessive P₂O₅ is undesirably extracted from the acid.

Thus it is only when acid having a P₂O₅ concentration of about 35 to 44% is treated with an extractant containing about 1 to 3 moles of a tertiary amine per mole of sulfate in the acid that the conditions are conducive for the selective extraction of substantial amounts of sulfate, without encountering an unwanted tendency toward emulsification of the two phase extraction system and without simultaneously extracting excessive amounts of P₂O₅.

In contrast to the present invention, the amine extraction techniques of the prior art, such as those disclosed in U.S. Pat. Nos. 3,458,282 and 3,367,749, have been concerned only with the concurrent removal of substantially all the sulfate and fluorine impurities for the production of high quality acid, and not with purification of the acid coupled with the separate recovery of the by-product fluorine. As pointed out above, it has been the practice in processes which use solvent extraction techniques for purifying phosphoric acid to carry out the solvent extraction at an acid concentration of about 30% $P_2O_5$. This makes impossible the recovery of fluorine during subsequent evaporation of the acid to the higher concentrations. The method of this invention provides for the convenient recovery of this fluorine as well as the purification of the acid.

In addition to facilitating the recovery of fluorine values, the present invention significantly decreases the volume of phosphoric acid that must be handled by the extraction equipment. In the extraction of 30% $P_2O_5$ acid, more volume of acid has to be processed than in the extraction of 35 to 44% acid, in order to produce the same tonnage of $P_2O_5$. The present invention therefore significantly reduces the size, and therefore the cost, of the extraction equipment used in carrying out the process.

DESCRIPTION OF THE PREFERRED EMBODIMENTS

Figure 1:
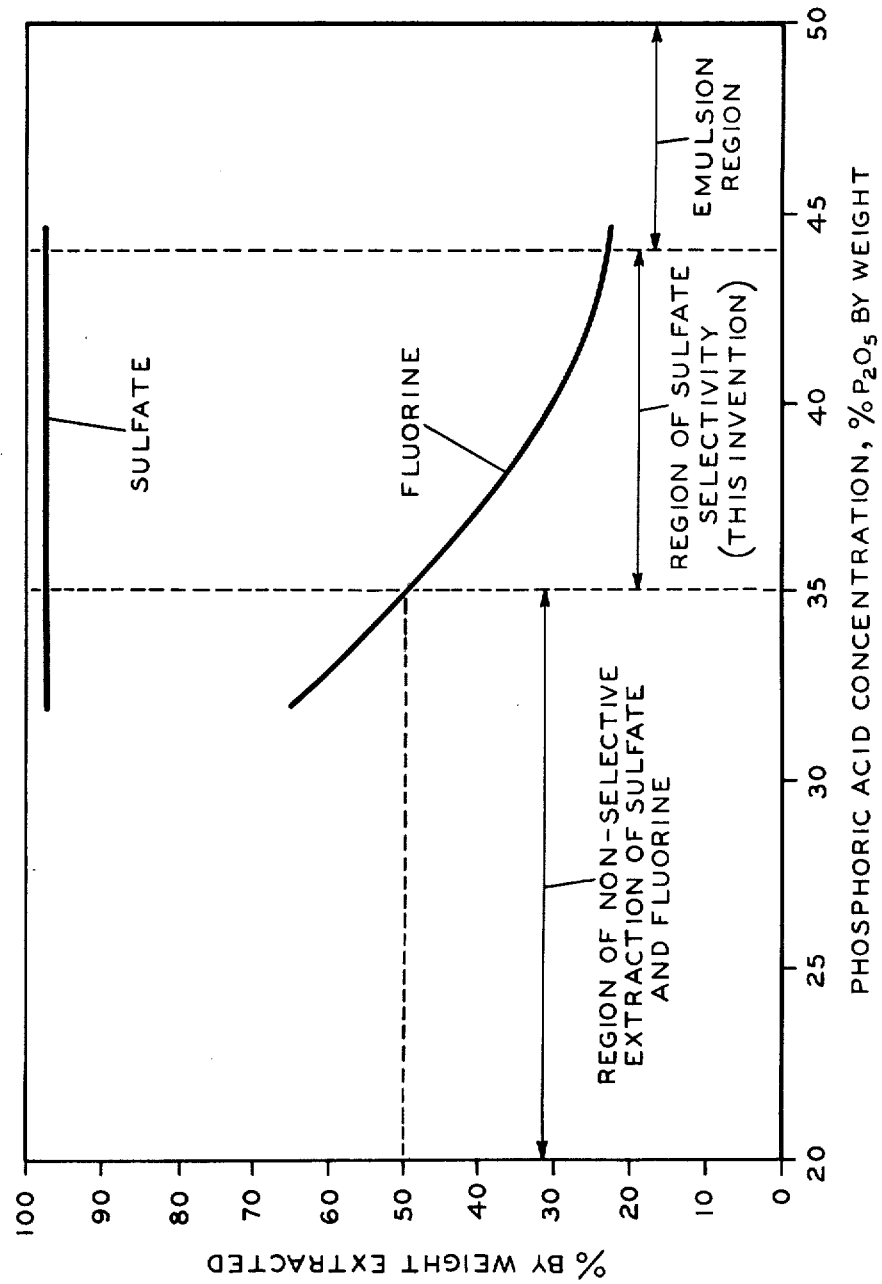
FIG. 1 is a graph showing the extent of sulfate and fluorine removal in the solvent extraction of phosphoric acid as a function of the $P_2O_5$ concentration of the treated acid, highlighting the decreased fluorine removal at $P_2O_5$ values in the range of 35 to 44% $P_2O_5$ while the extent of sulfate removal remains high and constant throughout this range.

In a preferred embodiment, crude, dilute (about 25-30% $P_2O_5$) wet process phosphoric acid is continuously fed to one or more evaporators where it is concentrated by the evolution of water vapor to about 40% $P_2O_5$. The fluorine, sulfate, and solids contents of the crude acid entering the evaporators are illustratively about 1.5 to 3%, 0.5 to 2.5% and 0.5 to 3%, respectively. The fluorine, sulfate, and solids contents of the acid leaving the evaporators are illustratively about 1.5 to 3%, 0.7 to 3.5%, and 1 to 5%, respectively. The $P_2O_5$ content to which the crude acid is concentrated can vary with different process considerations, but always remains between about 35 to 44%, and preferably between about 39 to 43%. The concentrated acid is then treated to remove solids using such techniques as settling, filtration, centrifuging, or other suitable means for clarifying the acid. Centrifugation can be used effectively in a preferred embodiment.

The clarified acid illustratively has a solids content less than about 0.1% and preferably less than about 0.05%. Some fluorine is removed in the solids removal step as sodium and potassium fluosilicate solids, but the amount removed is small. The bulk of the fluorine remains with the clarified acid.

The clarified acid is then extracted in accordance with the selected conditions of the present invention by contacting it with a prescribed amount of an extractant comprising a tertiary amine dissolved in a substantially water immiscible organic diluent. The tertiary amines which have been found to effectively extract the sulfate impurities from the clarified acid are those represented by the formula:

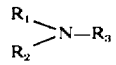

wherein $R_1$ and $R_2$ are each selected from the group consisting of saturated and ethylenically unsaturated aliphatic groups containing from 1 to 20 carbon atoms, and $R_3$ is selected from the group consisting of saturated and ethylenically unsaturated aliphatic groups containing from 6 to 20 carbon atoms. Preferred tertiary amines are those wherein $R_1$, $R_2$ and $R_3$ are each selected from the group consisting of saturated and ethylenically unsaturated aliphatic groups containing from 6 to 20 carbon atoms. Examples of preferred tertiary amines are tricaprylyl amine, tridodecyl amines, tricoco amine, trilauryl amine, tri iso-octyl amine and the like. Illustrative tertiary amines are disclosed in U.S. Pat. Nos. 3,458,282 and 3,367,749 whose disclosures are incorporated herein by reference. These patents describe the amines useful in the present invention in great detail and disclose methods for preparing the amines. Since this information is therefore known to those skilled in the art, it need not be repeated herein.

The organic diluent of the extractant is a liquid which is substantially immiscible in water and preferably has a boiling point above about 170°F. Examples of such diluents include organic liquids such as kerosene, toluene, naptha, and high boiling aliphatic hydrocarbons such as decane, dodecane, and the like. In addition, the extractant may optionally contain additives which are known to be effective in increasing the solubility of the tertiary amine in the organic diluent as discussed more fully in U.S. Pat. Nos. 3,458,282 and 3,367,749. Examples of such additives include aliphatic alcohols containing from about 8 to 16 carbon atoms, e.g., decanol, and certain aldehydes and ketones.

Sufficient tertiary amine is present in the extractant to provide a mole ratio of amine to sulfate initially present in the treated acid of about 1 to 3, and preferably about 1.5 to 2.5. Thus, the amine concentration in the extractant and the extractant-to-phosphoric acid flow rate ratio should be selected to provide between 1 and 3, and preferably between 1.5 and 2.5, moles of tertiary amine per mole of sulfate in the acid being processed. The extractant illustratively contains about 5 to 30% by volume of the tertiary amine, about 40 to 95% by volume of the organic liquid, and 0 to about 30% by volume of an additive for improving the solubility of the amine in the organic liquid. An extractant containing 20% by volume tertiary amine, 60% by volume organic liquid, and 20% by volume additive has been used effectively.

Any type of contacting-separation equipment may be used to carry out the extraction of the acid. In general, continuous countercurrent contacting-separation stages of the mixer-settler type normally used in solvent extraction operations are satisfactory. In a preferred embodiment, four mixer-settler stages are used for the extraction of the acid. Retention time in the mixers of these stages is illustratively about 0.5 to 5 minutes, and preferably about 1 to 4 minutes.

After extraction, the sulfate depleted phosphoric acid raffinate is concentrated to increase its $P_2O_5$ strength, and fluorine values may then by conveniently recovered during and/or after concentration. Thus the raffinate may be sent to one or several evaporators to be concentrated to about 54% $P_2O_5$ while simultaneously recovering the fluorine values from the fluorine-containing vapors evolved during the concentration, or the acid may be first concentrated to about 54% $P_2O_5$ and then stripped of its fluorine values with air or superheated steam and the fluorine values recovered by methods known in the art, e.g., by scrubbing the fluorine enriched gas with water or with a fluosilicic acid solution. In either case, the concentrated phosphoric acid produced is substantially free of sulfate and fluoride impurities and very low in solids. Typically, a 54% acid produced in this manner contains less than about 0.7% fluorine, less than about 0.5% sulfate, and less than about 0.5% solids. The acid raffinate may of course be evaporated to any desired $P_2O_5$ concentration other than 54 % such as, for example, to about 50 to 70% $P_2O_5$.

The sulfate-loaded extract from the extraction step is sent to a stripping operation where it is treated with an aqueous hydroxide solution or other suitable aqueous solution which will cause the formation of soluble sulfate salts whereby the sulfate impurities are stripped from the extract. A dilute sulfuric acid and/or a water wash of the extract before the stripping operation is often desirable to remove $P_2O_5$ values which have transferred into the extract during the extraction operation. The dilute acids from these optional washing steps can be utilized in the wet process for dilution of the sulfuric acid consumed in the attack zone or can be returned to any other convenient point in the process.

The lean extract is returned to the extraction operation for reuse in extracting the sulfate impurities from the clarified acid. Make-up extractant is provided as needed to make up for losses throughout the system. The stripped sulfate impurities may be returned to the attack zone of the wet process where they eventually may find their way out of the system through the filtering operations.

The configuration and design of the equipment used to strip the sulfate loaded extract are matters known to those skilled in the art and need not be repeated herein. Normally, counter-current mixing-settling in one to five stages results in efficient stripping of the extract.

The method of this invention reduces stripping agent requirements as compared with processes that extract substantial amounts of both sulfates and fluorides from the phosphoric acid. This is due to the fact that in the present invention the extract contains the sulfate impurities of the acid but no significant amounts of fluoride impurities and thus the strip solution need only be enough to supply the cations needed to react with and solubilize the sulfate. Very little strip solution is therefore needed to react with the small amounts of fluorine that transfer into the extract. The low fluorine content of the extract is a further advantage of the invention since it reduces the fluorine that ends up in waste streams, e.g., gypsum disposal streams, thereby reducing pollution problems.

The following example is provided to further illustrate the invention.

EXAMPLE 1

A countercurrent extraction system was operated continuously for 24 hours. The crude feed analyzed as follows:

|  | wt. % |
|---|---|
| $P_2O_5$ | 30 |
| $SO_4$ | 1.80 |
| F | 2.10 |

The acid was concentrated in one evaporator to 36.8% $P_2O_5$ and then clarified by aging and settling to reduce its solids content to 0.01%. The clarified acid analyzed as follows:

|  | wt. % |
|---|---|
| $P_2O_5$ | 36.8 |
| $SO_4$ | 2.19 |
| F | 1.85 |

This acid was fed to a four-stage counter-current mixer-settler extraction circuit at a rate of 972 grams of $P_2O_5$ per hour. The extractant used contained 20% by volume "Alamine 336", a commercial grade tricaprylyl amine manufactured by General Mills Corp., 60% by volume "Isopar H", a commercial grade saturated hydrocarbon diluent manufactured by Exxon Corporation, and 20% by volume decanol. The decanol was used to improve the solubility of the amine in the organic diluent.

The flow rate ratios of the extractant and acid were controlled to provide 1.74 moles of tricaprylyl amine per mole of sulfate contained in the acid. The raffinate or final product acid from the extraction operation contained less than 0.01% solids and analyzed as follows:

|  | wt. % |
|---|---|
| $P_2O_5$ | 36.8 |
| $SO_4$ | 0.13 |
| F | 1.36 |

The sulfate content of the acid had been reduced by 94% of the amount originally present while the fluorine content had been reduced by only 26%. Stated differently, the treated acid still contained about 74% of its original fluorine content but only about 6% of its original sulfate content. This corresponded to a calculated sulfate selectivity factor of about 3.6 showing that a highly selective sulfate extraction had been achieved. About 12% of the $P_2O_5$ values transferred to the organic phase, but the $P_2O_5$ concentration of the raffinate acid remained unchanged because a corresponding amount of water also transferred to the organic phase.

The raffinate was fed to an evaporator and concentrated and defluorinated to a $P_2O_5$ content of 54% and a fluorine content of 0.25%. The fluorine values were recovered from the evolved fluorine-containing gases in water scrubbing vessels. The 54% product acid leaving the evaporators had a solids content of 0.2% and a sulfate content of 0.2%.

The sulfate-loaded extract from the extraction operation was first washed with water in three countercurrent mixer-settler stages to recover the $P_2O_5$ values that transferred into the organic phase during extraction. The washed extract was then stripped with an aqueous 15% by weight sodium hydroxide solution in two countercurrent mixer-settler stages to regenerate the extractant and separate the sulfate impurities.

EXAMPLE 2

Figure 2:
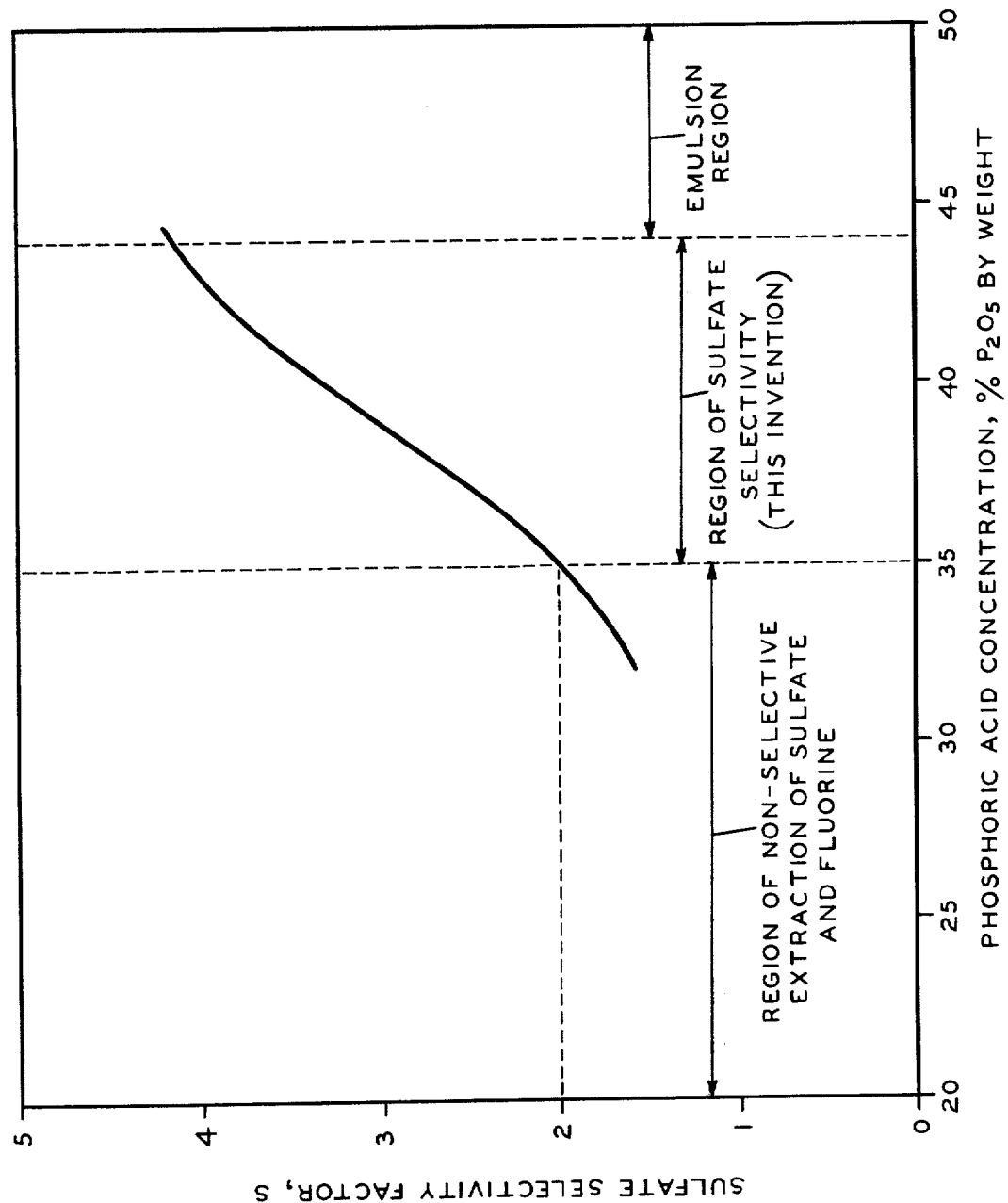
FIG. 2 is a graph based on the same data as that on which FIG. 1 was based, showing the variation of the sulfate selectivity factor as a function of the $P_2O_2$ concentration of the acid, highlighting the selective nature of the sulfate separation throughout the range of 35 to 44% $P_2O_5$ where the factor is always 2 or greater and continually increasing with increased $P_2O_5$ concentration.

A series of experiments was conducted in order to demonstrate the effect of $P_2O_5$ concentration upon the selectivity of the sulfate removal when the appropriate tertiary amine is used in the prescribed amounts. In carrying out these experiments the same procedure as in Example 1 was followed except that each run was carried out as a batch test instead of a continuous test, the $P_2O_5$ concentration of the acid varied from run to run, and 2 moles instead of 1.74 moles of amine per mole of sulfate present in the acid were used. Five runs were made in which the $P_2O_5$ concentration of the treated acid was 32.3, 35.3, 38.7, 42.6 and 44.3%, respectively. Results from each run, as well as the sulfate selectivity factor computed for each run are presented in Table 1 below:

pointed out, sulfate extraction is not considered selective unless the sulfate selectivity factor is 2 or greater. FIG. 2 shows that a factor of 2 is not achieved until the acid $P_2O_5$ concentration has risen to about 35%, and further that as the $P_2O_5$ concentration rises above 35%, the value of the factor increases dramatically and continuously until it reaches about 4 at about 44% $P_2O_5$. At this point, four times as much of the sulfate has been extracted as compared to fluorine, a condition of very high sulfate selectivity.

The detailed and specific information presented above is illustrative only, and such alterations and modifications thereof as would be apparent to one skilled in the art are deemed to fall within the scope and spirit of the invention, bearing in mind that the invention is defined only by the claims appended hereto.

What is claimed is:

1. In the method for separating fluorine and sulfate impurities from phosphoric acid by solvent extraction which comprises contacting the acid with an extractant comprising a water immiscible organic liquid and an organic amine, and separating the organic extractant phase containing the fluorine and sulfate impurities from the aqueous acid phase:

Table 1

| Run | Unextracted Acid % $P_2O_5$ | % $SO_4$ | % F | Extracted Acid % $P_2O_5$ | % $SO_4$ | % F | % $SO_4$ Extracted | % F Extracted | Calculated Sulfate Selectivity Factor |
|---|---|---|---|---|---|---|---|---|---|
| 1 | 32.3 | 2.00 | 1.99 | 32.7 | 0.05 | 0.75 | 97.4 | 62.1 | 1.57 |
| 2 | 35.3 | 2.23 | 1.80 | 35.3 | 0.08 | 0.95 | 96.4 | 47.1 | 2.05 |
| 3 | 38.7 | 2.38 | 1.60 | 37.9 | 0.03 | 1.06 | 98.8 | 34.0 | 2.90 |
| 4 | 42.4 | 2.50 | 1.41 | 41.9 | 0.01 | 1.06 | 98.8 | 25.1 | 3.95 |
| 5 | 44.3 | 2.56 | 1.41 | ← emulsification → | | | | | |

Certain data from Table 1 are plotted in FIGS. 1 and 2. In FIG. 1, the percent of sulfate and fluorine extracted is graphed as a function of the $P_2O_5$ concentration of the treated acid. FIG. 1 shows that while the amount of sulfate extracted remains essentially constant at about 98% throughout the range of $P_2O_5$ values studied, the amount of fluorine extracted is highly responsive to the $P_2O_5$ concentration of the acid, with the amount of extracted fluorine decreasing sharply as the $P_2O_5$ concentration increases. As shown in FIG. 1, the disparity between the amount of sulfate and fluorine extracted does not become sufficiently great to create a situation where the sulfate removal becomes selective until an acid $P_2O_5$ concentration of about 35% is reached, at which point about twice as much sulfate has been extracted as compared to fluorine. This sulfate selectivity continuously improves as the $P_2O_5$ concentration rises above 35% due to the continuously diminishing amount of fluorine being extracted. However, as the acid $P_2O_5$ concentration reaches about 44%, the acid and extractant tend to emulsify to the point where efficient separation of the aqueous and organic phases is no longer feasible. Thus the practical region of sulfate selectivity lies between $P_2O_5$ concentrations of 35 to 44%, with a non-selective extraction region occurring below 35% and an emulsion region occuring above 44%.

FIG. 2 is a plot similar to FIG. 1 except it graphs the sulfate selectivity factors from Table 1 as a function of $P_2O_5$ concentration, and shows even more graphically the highly selective nature of the extraction in favor of sulfate in $P_2O_5$ ranges of 35 to 44%. As previously the improvement whereby the sulfate impurities are selectively separated from the fluorine impurities in the final product acid of the solvent extraction, with the fluorine impurities remaining in the product acid, which comprises contacting a phosphoric acid containing fluorine and sulfate impurities and whose $P_2O_5$ concentration is about 35 to 44% by weight with an extractant comprising a water immiscible organic liquid and about 1 to 3 moles of a tertiary amine per mole of sulfate present in the acid, the tertiary amine having the formula:

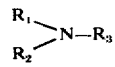

wherein $R_1$ and $R_2$ are each selected from the group consisting of saturated and ethylenically unsaturated aliphatic groups containing from 1 to 20 carbon atoms, and $R_3$ is selected from the group consisting of saturated and ethylenically unsaturated aliphatic groups containing from 6 to 20 carbon atoms, in at least four counter-current extraction stages, to thereby produce a product acid leaving the last stage which still contains about 50 to 85% of its original fluorine content but only about 1 to 45% of its original sulfate content, and which has a sulfate selectivity factor, as defined in the specification, of about 2 to 4.

2. The method of claim 1 wherein the $P_2O_5$ concentration of the treated acid is about 39 to 43%.

3. The method of claim 1 wherein the extractant contains about 1.5 to 2.5 moles of tertiary amine per mole of sulfate present in the acid.

4. The method of claim 1 wherein the tertiary amine is selected from the group consisting of tricaprylyl amine and tridodecyl amine.

5. The method of claim 1 wherein the acid is clarified before treatment with the extractant to remove solids.

6. The method of claim 1 wherein the treated acid is wet process acid, further including the step of stripping the sulfate loaded extractant with an aqueous solution capable of transferring the sulfate impurities from the extractant into the aqueous solution, and returning the stripped sulfate impurities to the attack zone of the process for elimination through the filtration steps of the wet process.

7. The method of claim 1 wherein the $P_2O_5$ concentration of the treated acid is about 39 to 43%, the extractant contains about 1.5 to 2.5 moles of tertiary amine per mole of sulfate present in the acid, and each $R_1$, $R_2$ and $R_3$ group of the tertiary amine contains from 6 to 20 carbon atoms.

8. In the method for separating fluorine and sulfate impurities from phosphoric acid by solvent extraction which comprises contacting the acid with an extractant comprising a water immiscible organic liquid and an organic amine, and separating the organic extractant phase containing the fluorine and sulfate impurities from the aqueous acid phase:

the improvement whereby the sulfate impurities are selectively separated from the fluorine impurities in the final product acid of the solvent extraction, with the fluorine impurities remaining in the product acid, which comprises contacting a substantially solids free wet process phosphoric acid containing fluorine and sulfate impurities and having a concentration of about 39 to 43% with an extractant comprising a water immiscible organic liquid containing about 1.5 to 2.5 moles of a tertiary amine per mole of sulfate present in the treated acid, the tertiary amine having the formula:

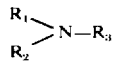

wherein $R_1$, $R_2$ and $R_3$ are each selected from the group consisting of saturated and ethylenically unsaturated aliphatic groups containing from about 6 to 20 carbon atoms, in at least four countercurrent extraction stages, to thereby produce a product acid leaving the last stage which still contains about 50 to 85% of its original fluorine content but only about 1 to 45% of its original sulfate content, and which has a sulfate selectivity factor, as defined in the specification, of about 2 to 4.

9. The method of claim 8 further including the step of stripping the sulfate loaded extractant with an aqueous solution capable of transferring the sulfate from the extractant into the aqueous solution, and returning the stripped sulfate impurities to the attack zone of the process for elimination through the filtration steps of the wet process.

10. The method of claim 1 wherein said product acid contains only about 1 to 6% of its original sulfate content.

11. The method of claim 3 wherein said product acid contains only about 1 to 6% of its original sulfate content, and wherein the tertiary amine is selected from the group consisting of tricaprylyl amine and tridodecylamine.

12. The method of claim 7 wherein said product acid contains only about 1 to 6% of its original sulfate content.

13. The method of claim 8 wherein said product acid contains only about 1 to 6% of its original sulfate content.

14. In the method for separating fluorine and sulfate impurities from phosphoric acid by solvent extraction which comprises contacting the acid with an extractant comprising a water immiscible organic liquid and an organic amine, and separating the organic extractant phase containing the fluorine and sulfate impurities from the aqueous acid phase:

the improvement whereby the sulfate impurities are selectively separated from the fluorine impurities in the final product acid of the solvent extraction, with the fluorine impurities remaining in the product acid, which comprises contacting a phosphoric acid containing fluorine and sulfate impurities and whose $P_2O_5$ concentration is about 35 to 44% by weight with an extractant comprising a water immiscible organic liquid and about 1 to 3 moles of a tertiary amine per mole of sulfate present in the acid, the tertiary amine having the formula:

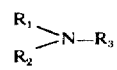

wherein $R_1$ and $R_2$ are each selected from the groups consisting of saturated and ethylenically unsaturated aliphatic groups containing from 1 to 20 carbon atoms, and $R_3$ is selected from the group consisting of saturated and ethylenically unsaturated aliphatic groups containing from 6 to 20 carbon atoms, to thereby produce a product acid which still contains about 50 to 85% of its original fluorine content but only about 1 to 6% of its original sulfate content, and which has a sulfate selectivity factor, as defined in the specification, of about 2 to 4.

15. The method of claim 14 wherein the $P_2O_5$ concentration of the acid is about 39 to 43%.

16. The method of claim 14 wherein the extractant contains about 1.5 to 2.5 moles of tertiary amine per mole of sulfate present in the acid.

17. The method of claim 14 wherein the tertiary amine is selected from the group consisting of tricaprylyl amine and tridodecylamine.

18. In the method for separating fluorine and sulfate impurities from phosphoric acid by solvent extraction which comprises contacting the acid with an extractant comprising a water immiscible organic liquid and an organic amine, and separating the organic extractant phase containing the fluorine and sulfate impurities from the aqueous acid phase:

the improvement whereby the sulfate impurities are selectively separated from the fluorine impurities in the final product acid of the solvent extraction, with the fluorine impurities remaining in the product acid, which comprises contacting a phosphoric acid containing fluorine and sulfate impurities and whose $P_2O_5$ concentration is about 35 to 44% by weight with an extractant comprising a water immiscible organic liquid and about 1 to 3 moles of a tertiary amine per mole of sulfate present in the acid, the tertiary amine having the formula:

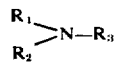

wherein $R_1$ and $R_2$ are each selected from the group consisting of saturated and ethylenically unsaturated aliphatic groups containing from 1 to 20 carbon atoms, and $R_3$ is selected from the group consisting of saturated and ethylenically unsaturated aliphatic groups containing from 6 to 20 carbon atoms, to thereby produce a product acid which still contains about 50 to 85% of its original fluorine content but only about 1 to 45% of its original sulfate content, and which has a sulfate selectivity factor, as defined in the specification, of about 2 to 4.

* * * * *